United States Patent
Gueneau et al.

(10) Patent No.: US 7,387,839 B2
(45) Date of Patent: Jun. 17, 2008

(54) SUBSTRATE WITH PHOTOCATALYTIC COATING

(75) Inventors: Lethicia Gueneau, Vincennes (FR); Mauricette Rondet, Vitry sue Seine (FR); Ronan Garrec, Compiegne (FR); Jean-Pierre Petit, Saint-Egreve (FR); Alain Denoyelle, Grenoble (FR); Yves Wouters, Poisat (FR)

(73) Assignee: Saint-Gobain Glass France, Courbevoie (FR)

( * ) Notice: Subject to any disclaimer, the term of this patent is extended or adjusted under 35 U.S.C. 154(b) by 236 days.

(21) Appl. No.: 10/477,195

(22) PCT Filed: May 15, 2002

(86) PCT No.: PCT/FR02/01629

§ 371 (c)(1),
(2), (4) Date: Apr. 30, 2004

(87) PCT Pub. No.: WO02/092879

PCT Pub. Date: Nov. 21, 2002

(65) Prior Publication Data

US 2004/0180220 A1    Sep. 16, 2004

(30) Foreign Application Priority Data

May 16, 2001  (FR) .................................. 01 06432

(51) Int. Cl.
*B32B 17/06* (2006.01)
(52) U.S. Cl. ................... 428/428; 428/432; 428/698; 428/701; 428/702; 428/704
(58) Field of Classification Search ................. 428/428, 428/432, 698, 701, 702, 704
See application file for complete search history.

(56) References Cited

U.S. PATENT DOCUMENTS

| 6,037,289 | A  | * | 3/2000 | Chopin et al. .................. 502/2 |
| 6,191,062 | B1 | * | 2/2001 | Hayakawa et al. .......... 502/159 |
| 6,362,121 | B1 | * | 3/2002 | Chopin et al. .................. 502/2 |
| 2004/0180220 | A1 | | 9/2004 | Gueneau et al. |

FOREIGN PATENT DOCUMENTS

| EP | 1 066 878 | | 1/2001 |
| EP | 1 081 108 | | 3/2001 |
| FR | 2 738 836 | | 3/1997 |
| FR | WO 98/23549 | * | 6/1998 |
| FR | WO 99/44954 | * | 9/1999 |

OTHER PUBLICATIONS

U.S. Appl. No. 11/579,865, filed Nov. 8, 2006, Gueneau, et al.

* cited by examiner

*Primary Examiner*—G. Blackwell
(74) *Attorney, Agent, or Firm*—Oblon, Spivak, McClelland, Maier & Neustadt, P.C.

(57) ABSTRACT

The subject of the invention is a substrate provided on at least part of at least one of its faces with a coating having photocatalytic properties, containing photocatalytic titanium oxide, especially crystallized in the anatase form, in an essentially mineral binder comprising at least one semiconducting metal oxide.

Figure 1:
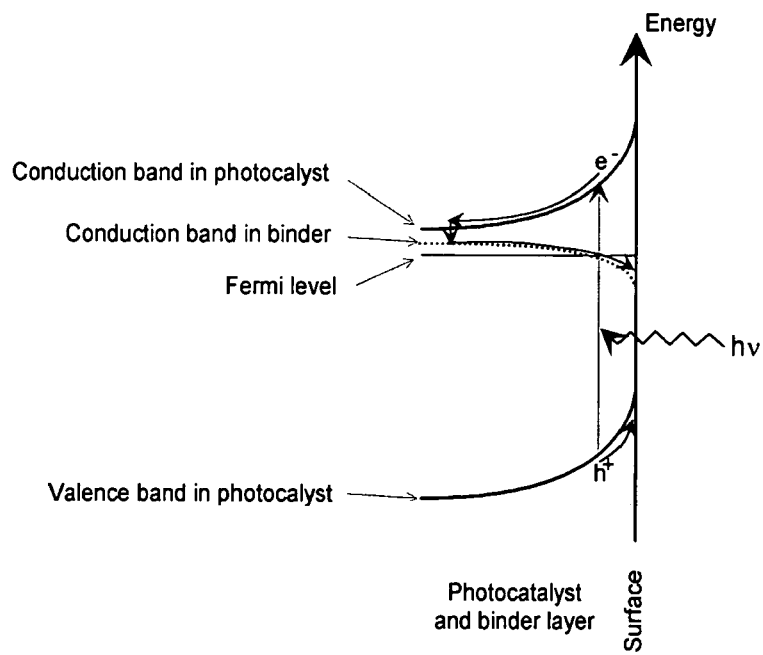

The subject of the invention is also a process for obtaining said substrate, especially by thermal decomposition of precursors or by a vacuum deposition technique.

30 Claims, 3 Drawing Sheets

SUBSTRATE WITH PHOTOCATALYTIC COATING

BACKGROUND OF THE INVENTION

1. Field of the Invention

The present invention relates to substrates provided with a photocatalytic coating, to the process for obtaining such a coating and to its various applications.

It relates more particularly to coatings comprising semiconducting materials based on metal oxides, especially titanium oxide, which are capable, under the effect of radiation of suitable wavelength, for initiating radical reactions causing the oxidation of organic substances.

The coatings thus allow the materials that they coat to be given new functionalities, especially anti-soiling, fungicidal and bactericidal properties, these optionally being combined with hydrophilic properties, antifogging properties, optical properties, etc.

Very diverse substrates may be envisioned, especially those used in the field of vehicles or buildings, such as glazing and curtain wall, cladding, roofing or floor materials, such as tiles, slates, slabs, tiling and more generally any material used in construction. These materials may thus be made of glass, metal, glass-ceramic, ceramic, cement, brick, wood, stone or material reconstituted from these natural materials, of plastic or, fibrous material of the mineral wool type, especially for filtration processes, etc.

They may also be classified as transparent materials, used in particular in glazing, such as glass or flexible or rigid plastic substrates, such as substrates made of a polyester or of an acrylate like polymethyl methacrylate (PMMA). The substrates may also be classified in the category of non-porous or slightly porous materials (glass) or in the category of (relatively) porous materials, such as tiles and ceramics.

The substrates may be regarded as "mono-materials" such as glass substrates, or substrates comprising a superposition of materials, or layers, such as curtain walls provided with a coating of the curtain wall render type.

2. Description of the Prior Art

Already known, from international patent applications WO 97/10186 and WO 97/10185 are coatings containing anatase-crystallized $TiO_2$ having photocatalytic properties, these coatings being obtained from the thermal decomposition of suitable organometallic precursors and/or from "precrystallized" $TiO_2$ particles encapsulated in a mineral or organic binder.

Also known, from patent WO 99/44954 is an improvement to these types of coatings consisting in the use of precrystallized $TiO_2$ particles encapsulated in a binder which also contains partially crystallized $TiO_2$: the binder thus participates in the photocatalytic effect of the particles, enhancing the performance of the coating both in terms of photocatalytic properties and durability properties.

Also known, from patent applications EP-1 036 826 and EP-1 081 108, are coatings using $TiO_2$ particles in a binder containing zirconium oxide.

BRIEF SUMMARY OF THE INVENTION

The object of the invention is therefore to improve known photocatalytic coatings, especially in terms of the level of photocatalytic performance, durability of its performance over time and/or mechanical/chemical endurance.

The subject of the present invention is firstly a substrate provided on at least part of at least one of its faces with a photocatalytic coating containing photocatalytic titanium oxide (preferably essentially or predominantly in anatase form), which is in an essentially mineral binder comprising at least one semiconducting metal oxide.

It is preferred to choose a semiconducting oxide which, under solar illumination, exhibits substantially no photocatalytic activity (or in this case the photocatalytic activity of which is markedly less than that of $TiO_2$), and significant electronic conductivity. Its resistivity is advantageously chosen to be less than or equal to $10^8$ ohm.cm, especially less than or equal to $10^7$ or $10^6$ ohm.cm. The resistivity may even be chosen to be much lower, for example, less than 10 ohm.cm. (By extension, this resistivity may be that of the binder in its entirety if it contains several semi-conducting oxides and optionally other compounds which are not conducting.)

In fact, as will be explained in detail below, it proves to be the case that semi-conducting oxides, thus having a certain level of electronic conductivity, make it possible, in the form of a binder in association with photocatalytic $TiO_2$ to increase the effectiveness of the photocatalysis process, compared with a binder which is electrically insulating, for example an $SiO_2$-based binder. Surprisingly, using such a "conducting" binder according to the invention makes it possible to increase the photocatalytic level of the coating in its entirety and also to increase the durability of this functionality.

This application therefore differs from the teaching of patent WO 99/44954. The present invention does not entail making the coating more photocatalytic, using a binder which is partially crystallized and itself photocatalytic. Here, it does not entail enhancing the significant photocatalytic activity of crystallized $TiO_2$ particles with that, lower activity, coming from the binder. In the invention, the aim is above all to exploit only the electronic conductivity properties of the binder which, moreover, may be completely amorphous, devoid of photocatalytic activity per se.

It has thus been discovered in the invention that there is a cooperative effect or synergy between the photocatalytic material and the material with which it is intimately combined, namely its binder.

DETAILED DESCRIPTION OF THE INVENTION

According to a first embodiment of the invention, at least part (especially all or most) of the photocatalytic titanium oxide is incorporated into the coating in the form of pre-formed particles. Preferably, particles of nanometric size are chosen. These particles are generally in the form of agglomerates of crystallites, the agglomerates having a mean size of about 5 to 80 nm (for example 30 to 60 nm) and the crystallites having a mean size of about 5 to 20 nm (especially 5 to 10 nm). They are generally handled in the form of a dispersion in a liquid phase, especially as a colloidal suspension in aqueous medium or as a dispersion in one or more organic solvents. These mean sizes correspond to diameters, likening by approximation their shapes to spheres (even if this is not necessarily the case, it being possible for the particles to have a lenticular shape or a rod shape). To a first approximation, it may be considered that the same agglomerates are found in the final coating, these having undergone only slight structural or dimensional modification. In fact, it has been observed that when the process for manufacturing the coating involves a heat treatment, it is generally accompanied by a substantial increase in the size of the crystallites, for example by a factor of 1.5 to 2.5, as explained in detail in the aforementioned patent WO 99/44954.

According to a second embodiment, at least part of the photocatalytic titanium oxide is formed during formation of the coating, especially by thermal decomposition of organometallic-type precursors or metal halides or metal salts. As explained in the aforementioned patent WO 97/10186, coating deposition techniques (mentioned in detail below), of the sol-gel or ad hoc precursor pyrolysis type, allow in situ formation of photocatalytic $TiO_2$ "particles" (either right from the hot deposition or by crystallization by a postdeposition heat treatment). In that case, there are also crystalline $TiO_2$ domains (in anatase form) distributed within the binder, which may be likened to the particles formed beforehand, described in the first embodiment, it being understood that amorphous $TiO_2$ domains may also be present.

The two embodiments are alternatives or may be combined.

To magnify the impact of the "conducting" binder according to the invention (included within this term, in the rest of the text, will be the presence in the binder of one or more semiconducting metal oxides), it is possible to increase its electronic conductivity by doping the semiconducting oxide or oxides of the binder with a metal or a halogen. This doping, especially with a halogen, may be carried out using a deposition technique involving the thermal decomposition of halogenated precursors (which are also the precursors of one of the oxides of the coating or which is a precursor whose sole function is to provide the halogen), said technique being mentioned above. To facilitate the incorporation of the halogen into the coating, especially when starting with the precursors of the metal halide type, it is possible to carry out on the coating, during or after its deposition, a heat treatment in an atmosphere which is substoichiometric in terms of oxygen.

In fact, the term "doping" should be interpreted broadly, in the sense that the dopant is incorporated into the coating without it necessarily being only localized in the binder or on one of the compounds constituting the binder.

The inventors were interested in the reason why, for the same amount of photocatalytic $TiO_2$, a higher photocatalytic level was obtained with a conducting binder. In fact, under the effect of suitable radiation, centered on the ultraviolet, electron-hole pairs are generated in the photocatalytic $TiO_2$ particles: the holes initiate radical reactions which cause the oxidation of organic substances, the electrons having to produce an electrochemical reduction. The presence of a conducting binder would allow two things to happen:

- on the one hand, it could receive the photoelectrons generated in the photocatalytic $TiO_2$, and allow these electrons to carry out therein an electrochemical reduction, in principle the reduction of oxygen. There is thus cooperation between the photocatalytic particles and their binder, the photocatalytic particles being the site of oxidation reactions brought about by the photoholes, while the binder is the site of reduction reactions brought about by the photoelectrons which were transferred thereto. The redox cycle involved in the photocatalysis phenomenon would therefore be optimized, allowing the electrons to be used efficiently;
- on the other hand, this "removal" of electrons is unfavorable to the spontaneous recombination of the electron-hole pairs generated by the particles, which here again goes toward greater efficiency of the particles.

Two situations may occur, but these are not limiting.

In a first situation, the or at least one of the semiconducting metal oxides of the binder has the lowest energy level of its conduction band, which level is:

- ●—less than or equal to the lowest energy level of the conduction band of the photocatalytic titanium oxide;

- ●—close to the electron energy level (the most probable level) of oxygen, $E^0_{ox}$, in the $O_2/H_2O_2$ or $O_2/H_2O$ redox couple.

①—the relative positioning of the conduction bands of the binder and of the photocatalytic oxide is important: although it is necessary for the conducting binder to have an electron conduction level sufficient to take the electrons to the surface of the binder, it is also necessary for the conduction band of the binder to be close to, preferably lower, in terms of energy, than that of the photocatalytic $TiO_2$, so that the electrons can pass from one material to the other, ②—as regards the energy level $E^0_{ox}$ of the $O_2/H_2O_2$ or $O_2/H_2O$ redox couples this is similar to that of the conduction band of the conducting binder, the two reactions—reduction (on the binder) and oxidation (on the $TiO_2$)—will be favored and the electrons will be able to carry out the desired electrochemical reduction.

A number of oxides meet these two conditions ① and ②.

These are especially titanium oxide $TiO_2$, tin oxide $SnO_2$, antimony oxide (especially $Sb_2O_3$ and/or $Sb_2O_5$), zinc oxide $ZnO$, tungsten oxide $WO_3$, cobalt oxide $Co_3O_4$, nickel oxide $NiO$, and a cobalt nickel mixed oxide $NiCO_2O_4$. Each of these oxides may also be doped (such as $Al:ZnO$, $Sb:SnO_2$, $F:SnO_2$, $F:ZrO_2$, $F:Sb_2O_3$, and $F:ZnO$). They may also be mixed oxides containing manganese (the manganite family) and mixed oxides containing cobalt (the cobaltite family).

It turns out that the abovementioned oxides containing Co, Ni or Mn have a further benefit: these are compounds which are catalytic in terms of oxygen reduction. The abovementioned redox reaction is again favored. There are studies in the literature on the catalytic properties of Ni and Co mixed oxides, especially the publication "Surfaces properties of Ni and Co mixed oxides: a study by X rays, XPS, BET and PZC", by L. A. De Faria, J. F. Koenig, P. Chartier and S. Trasatti (Electrochemica Acta 44 (1998), 1481-1489). Publications describe sol-gel methods of obtaining Ni and/or Co oxides, such as the publication by F. Svegl et al. in Electrochemica Acta 45 (2000), 4359-4371, the publication by G. Spinolo et al. in Journal of Electroanalytical Chemistry 423 (1997), 49-57, and that by J. G. Kim et al. in Applied Surface Science 165 (2000), 70-84.

One advantageous method of implementing the invention therefore consists in ensuring that the "conducting" binder is not only electronically conducting but is also catalytic with respect to the reduction of oxygen (at least for one of the semiconducting oxides that it contains, if it contains several of them).

In a second situation, the or at least one of the semiconducting metal oxides of the binder has:

- ●—the lowest energy level of its conduction band, which is greater than that of the photocatalytic titanium oxide;

- ●—electron states in the band gap, especially those associated with structural defects and/or pendant bonds. These are especially aluminum oxide $Al_2O_3$ and zirconium oxide $ZrO_2$ (these oxides possibly being doped). Despite the unfavorable position of their conduction bands, this type of oxide has proved to be advantageous since they thus have intermediate energy states lying within their band gap which allow them to receive electrons (and approach the levels $E^0_{ox}$ of the $O_2/H_2O_2$ or $O_2/H_2O$ couples).

According to one embodiment of the invention, the binder according to the invention may furthermore include at least one electrically insulating compound, especially a silicon derivative such as silicon oxide, silicon oxynitride, silicon oxycarbide or silicon nitride.

The term "insulating" is understood to mean materials which have in particular a resistivity of greater than $10^{10}$ ohm.cm, especially greater than $10^{12}$ ohm.cm.

An extremely advantageous consequence of the invention is that it is possible to vary very much more freely the amount of photocatalytic $TiO_2$ in the coating: even relatively low levels make it possible in any case to obtain satisfactory photocatalytic levels thanks to the magnifying effect of the conducting binder. Especially in the embodiment in which preformed photocatalytic $TiO_2$ particles are used, this may be a considerable advantage as a high content of preformed particles in the coating generally tends to lower their durability and/or their adhesion to the substrate on which the coating is deposited: the invention thus makes it possible, more particularly in this embodiment, to obtain a better performance/durability compromise.

A ratio $R_{TiO_2/binder}$ by weight of photocatalytic titanium oxide to binder may thus be chosen which varies between 10/90 and 60/40, especially 10/90 and 50/50 or 20/80 and 40/60.

With regard to the composition of the binder, it is preferable for the content of semiconducting metal oxide(s) in the binder to be at least 25% by weight, especially at least 50 and up to 100% by weight. It may be advantageous, as mentioned above, to add a nonconducting material, such as $SiO_2$, especially for optical considerations: thus, the presence of $SiO_2$ may lower the overall refractive index of the coating, thereby making it possible if necessary to lower its light reflection.

Advantageously, the amount of titanium oxide present in the coating is between 5 and 100 µg/cm², especially between 10 and 50 or between 15 and 35 µg/cm². Here, this is all of the titanium oxide, comprising both photocatalytic crystallized $TiO_2$ and also possibly amorphous photocatalytic $TiO_2$, if there is some of this in the binder.

Preferred embodiments according to the invention consist of coatings in which the binder is made of zirconium oxide or titanium oxide, possibly combined with silicon oxide.

The coatings according to the invention have in particular a photocatalytic activity of the coating, relative to the total amount of titanium oxide, of at Least 2 nm/h/(µg/cm²), especially of at least 5, 10 or 20 nm/h/(µg/cm²). The fact of relating this activity to the total amount of $TiO_2$ allows the impact of the binder on its performance to be better evaluated, as the examples will demonstrate later.

The coatings according to the invention, most particularly when they are intended to cover glass or transparent substrates in order to make glazing, preferably remain with an interferential thickness (at most 1 µm, generally around 10 to 300 nm).

One embodiment, according to the invention, consists in combining the coating with at least one other layer of interferential thickness. This may be a layer having thermal properties (low emissivity), having an optical function (in order to lower the level of light reflection or to modify its color by an interferential effect) or acting as a barrier to the migration of species diffusing out of the substrate: the layer is therefore inserted between the substrate and the coating. This is particularly useful when the substrate is made of glass, in order to prevent the diffusion of alkali metals. The barrier sublayer may be made of a silicon derivative, such as silicon oxide, silicon oxycarbide, silicon oxynitride or silicon nitride, or based on an optionally doped metal oxide (F:$SnO_2$, Sb:$SiO_2$, etc.). The coating may thus constitute the final layer of, for example, a heat-reflecting/low-emissivity multilayer.

The applications of the coated substrate according to the invention have already been mentioned in the preamble of the application. They may in fact be any architectural material, especially glazing, a roofing material or a cladding, floor or false-ceiling material. They may also be materials used in means of locomotion (automobile, train, airplane, boat) especially glazing or materials intended for domestic electrical appliances (oven walls, glazed walls of a refrigerator/freezer, etc.).

The substrates that can be used are therefore very varied: transparent material of the glass or polymer type, ceramic, glass-ceramic, wood, metal cement, stone, facing render, material reconstituted from natural materials, etc.

It is also possible to deposit the coating on fibrous materials of the mineral wool type for thermal and/or acoustic insulation or else any reinforcing yarn assembly, for applications in the field of filtration for example.

Since the coatings according to the invention are also hydrophilic, it is also possible to exploit, depending upon the applications, their anti-soiling and/or bactericidal/fungicidal and/or antifogging properties, depending on the requirements.

The subject of the invention is also the process for obtaining the coated substrate described above. In a first variant, it is possible to use a technique involving the thermal decomposition of at least one organometallic precursor or a precursor in the form of a metal halide or a metal salt. The actual deposition phase may or may not be followed by a postdeposition heat treatment, for example, from around 30 minutes to several hours at 350-550° C. (cold deposition of the sol-gel type or hot deposition of the pyrolysis type).

In a second variant, it is possible to use a vacuum deposition technique, especially sputtering, preferably magnetic-field-enhanced sputtering. It may be reactive sputtering (using a target made of metal/metals or alloys, with deposition in the presence of at least oxidizing species), or nonreactive sputtering (using ceramic targets of suitable composition).

Figure 2:
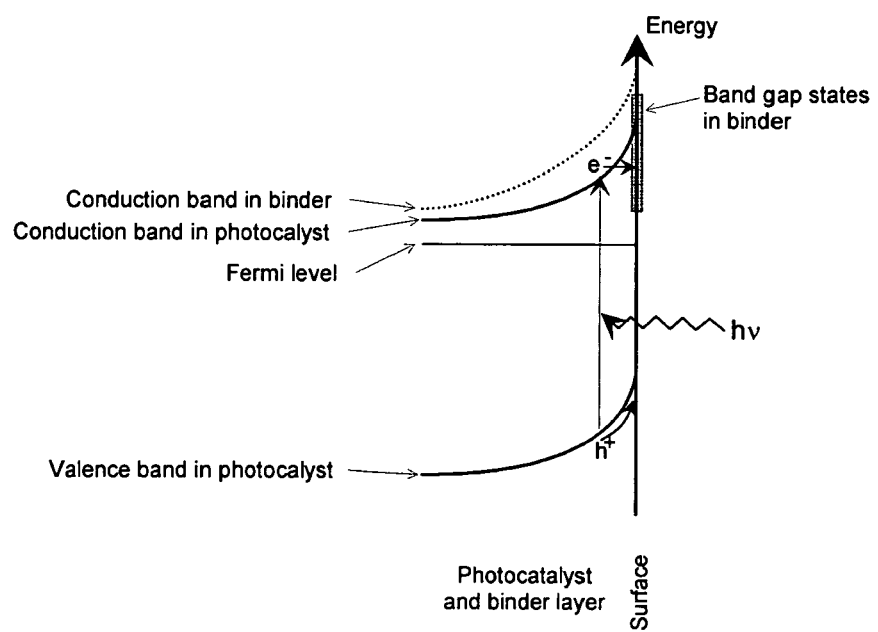
Figure 3:
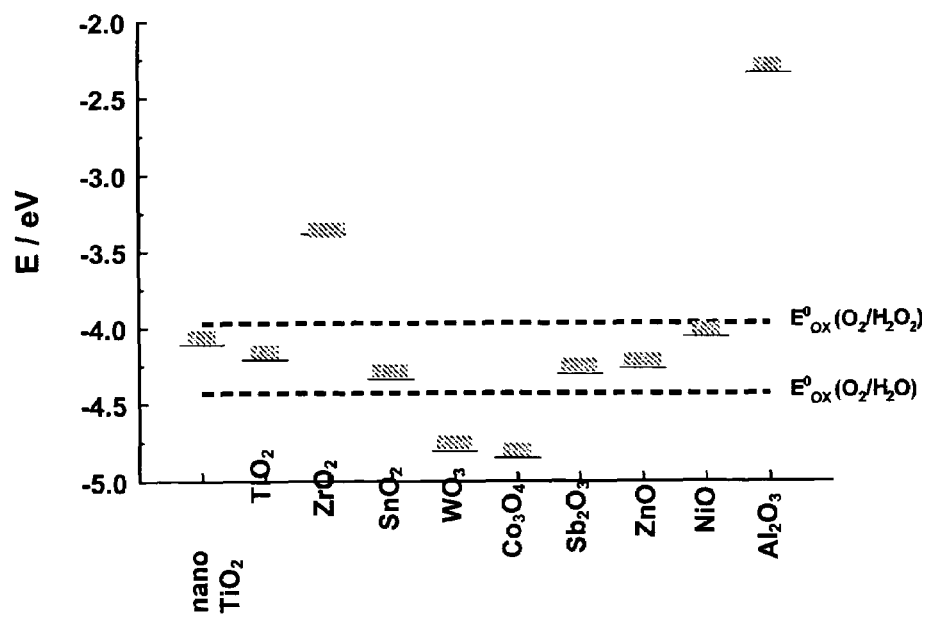
Figure 4:
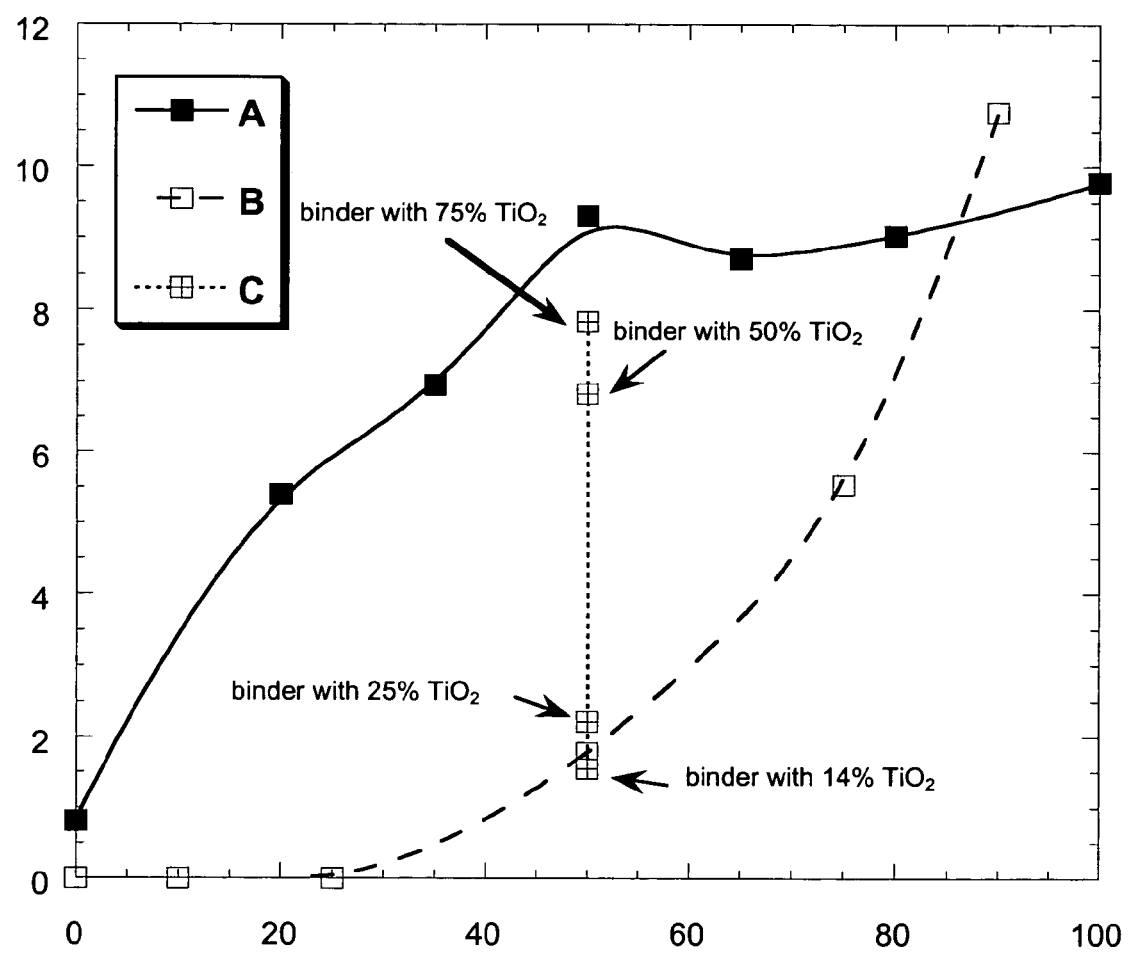

The invention will be described below in greater detail with the aid of nonlimiting examples and the following figures:

FIGS. 1 to 3: details concerning the probable mechanisms involving the conducting binder of the invention in the level of photocatalytic activity of the coating;

FIG. 4: a graph showing the photocatalytic activity of coatings according to the invention.

FIG. 1 illustrates the first situation mentioned above, namely when the conducting binder comprises a semiconducting oxide whose lowest level of its conduction band is below that of the photocatalytic $TiO_2$. The x-axis represents the increasing electron energy level (in eV), the solid line $C_1$ corresponds to the lowest level of the conduction band of the photocatalytic $TiO_2$ and the dotted line $C_2$ corresponds to that, for example of $SnO_2$, $Sb_2O_3$ or ZnO (binder), and the line $C_3$ corresponds to the lowest energy level of the valence band of the photocatalytic $TiO_2$. The x-axis is the boundary between the thickness of the coating (on the left) and its surface facing outward (on the right). The horizontal line $C_4$ represents the Fermi level.

Electrons, shown symbolically by e, will therefore, by photoexcitation, pass from the conduction band of the $TiO_2$ to that of, for example, the lower-energy $SnO_2$. Electrons then tend to be taken to the surface of the coating.

FIG. 3 shows, along the ordinate scale, the energy (in eV at pH=7) of the bottom of the conduction band of various oxides and the oxygen levels $E^0_{ox}$ in the $O_2/H_2O_2$ and $O_2/H_2O$ couples ($E^0_{ox}$ is the most probable level, at the center of a Gaussian distribution having a width close to 0.8 eV). It may be verified that $SnO_2$, for example, which lies between the two levels of the $O_2/H_2O_2$ and/or $O_2/H_2O$ couples, is well placed to carry out electrochemical reduction of oxygen into $H_2O_2$ or $H_2O$ with the electrons that it has recovered from the photocatalytic particles. The oxides $TiO_2$, $Sb_2O_3$, ZnO, and NiO are also suitable; $WO_3$ and $CO_3O_4$ are slightly low, but still may be suitable since they differ by less than 0.5 eV, especially less than 0.4 eV, from the redox potential of the $O_2/H_2O$ couple, and $CO_3O_4$ is an oxide known to be catalytic in respect of oxygen reduction.

The second situation mentioned above is illustrated in FIG. 2: in this case, with the same conventions as in FIG. 1, the conduction band of the conducting binder, for example made of $ZrO_2$ or $Al_2O_3$ is above that of the photocatalytic $TiO_2$. Their positions in FIG. 3 do not seem in theory, favorable. In fact, these two oxides also make it possible to receive the electrons coming from the photocatalytic material, since they possess intermediate energy states in their band gaps (shown symbolically in FIG. 2 by a hatched region along the x-axis).

EXAMPLES 1 to 5

These five examples relate to a 3 mm substrate made of clear silica-soda-lime glass, surmounted by an SiOCfirst layer deposited in a known manner by CVD (Chemical Vapor Deposition), and then a photocatalytic coating consisting of an $SiO_2+TiO_2$ mixed binder encapsulating preformed $TiO_2$ particles.

The deposition was carried out by sot-gel, by dip-coating, as described in the aforementioned patent WO 99/44954, using a solution ❷containing the precursors of the binder and using:
- as solvent: ethanol and ethylene glycol in mass proportions of 75/25
- as stabilizer: acetyl acetonate
- as $TiO_2$ precursor: titanium tetrabutoxide (TBT)>
- as $SiO_2$ precursor: tetraethylorthosilicate (TEOS) and a dispersion ❷, which was:
- the ethylene glycol liquid phase containing the photocatalytic crystallized particles, with the following characteristics:

| | |
|---|---|
| specific surface area of the particles: | $\geq 350$ m²/g |
| size of the particles: | ≈40 nm |
| size of the crystallites constituting the particles: | 7 nm |
| crystalline phase: | more than 80% anatase |

Next, the solution ❷and the dispersion ❷were combined in ad hoc concentrations/proportions so as to have, in the coating, the $TiO_2$ and $SiO_2$ and nanoparticle contents desired in the binder.

The photocatalytic activity of the coating was measured in the following manner, using palmitic acid: a layer of palmitic acid was deposited by spraying a solution in the chloroform onto the sheet to be tested. The amount deposited was then determined by weighing. The sheet was then placed under UV irradiation (approximately 30 W/m²) and the haze induced by the presence of palmitic acid was measured over time. This was used to determine the rate of disappearance of palmitic acid, expressed in nm/h. This rate could also have been related to the total amount of $TiO_2$ (in µg/cm²) present on the glazing studied (representative of the thickness of the layer) and therefore expressed in (nm/h)/(µg/cm²).

The coatings according to the five examples all contained 50% by weight of preformed $TiO_2$ nanoparticles and 50% by weight of binder distributed between $SiO_2$ and $TiO_2$. They were annealed after deposition at around 500° C.

Table 1 below gives, for each of the examples, the following data (example 1 has a 100% $SiO_2$ binder and is therefore a comparative example):
- the $TiO_2$ content with respect to $SiO_2$ in the binder, in mol %: "% $TiO_2$ binder";
- the level of photocatalytic activity of the coatings "PA", according to the test described plus, expressed in nm/h/(µg/cm²), relative to the total amount of $TiO_2$ in the coating.

TABLE 1

| EXAMPLE | % $TiO_2$ BINDER | PA |
|---|---|---|
| 1 (comparative) | 0 (100% $SiO_2$) | 1.1 |
| 2 | 14 | 1.5 |
| 3 | 25 | 2.2 |
| 4 | 50 | 6.8 |
| 5 | 75 | 7.8 |

EXAMPLE 6

This example relates to a coating deposited on the same substrate and by a technique called "dip-coating", containing 50% by weight of preformed $TiO_2$ nanoparticles (those used in the previous examples) and 50% of a binder based 100% on zirconium oxide.

The operating method was as follows: zirconium isopropoxide was added to isopropanol. Acetylacetone was added thereto and the solution diluted with ethanol. This solution was then mixed with a dispersion of nanoparticles in colloidal suspension in water acidified with nitric acid. After deposition, the coating was annealed at around 500° C. and the photocatalytic activity PA of the coating thus obtained was, following the convention used for the previous examples, 2.5 nm/h/(µg/cm²).

EXAMPLES 7 and 8

These examples relate to coatings containing (by weight) only 10% preformed nanoparticles.

Example 7 is the comparative example, comprising a 100% $SiO_2$ binder, the deposition being made by dip-coating.

Example 8 uses an antimony-doped 100% $SnO_2$ binder.

In the case of example 7, a colloidal suspension of $TiO_2$ nanoparticles, as in example 6 and a TEOS-based solution were used.

In the case of example 8, the operating method was as follows: tin chloride ($SnCl_2$) was dissolved in dimethylformamide. Next, antimony chloride was dissolved in dimethylformamide and this second solution added to the first. Next, a colloidal suspension of $TiO_2$ nanoparticles as previously was added, the concentration of which was adjusted. The coating was deposited by dip-coating. It was then annealed at around 500° C.

In the case of example 7, the measured photocatalytic activity PA was 0.1 nm/h/(µg/cm²).

In the case of example 8, the measured photocatalytic activity PA was 3 nm/h/(µg/cm²).

From this series of examples 1 to 8, it may be seen that, for the same amount of $TiO_2$ the binder has a direct influence on the photocatalytic activity of the coating, whereas it is not (or hardly) photocatalytic itself.

This is especially striking in the case of example 8, which contains very few photocatalytic $TiO_2$ nanoparticles.

The importance of the semiconducting and electron conduction properties of the binder is thus proved.

As a reminder, the electrical resistivities of conducting oxides that can be used within the context of the invention are given below, in comparison with those of the glass and of $SiO_2$:

| | |
|---|---|
| Al:ZnO | $10^{-3}$ |
| Sb:$SnO_2$ | $10^{-2}$ |
| $SnO_2$ | 5 |
| $ZrO_2$ | $10^7$ |
| $TiO_2$ | $10^5$ |
| Glass | $10^{12}$ |
| $SiO_2$ | $10^{17}$ |

Three series of examples A, B, C were then made, using a $TiO_2+SiO_2$ mixed binder and $TiO_2$ nanoparticles, in a similar manner to the series of examples 1 to 5 (same deposition method, same precursors).

Table 2 below summarizes, for each example of each series (the percentages are by weight)
  the % of nanoparticulate $TiO_2$
  the % $TiO_2$ of the binder
  the % $SiO_2$ of the binder The photocatalytic activity value of the coating in its entirety PA', expressed in nm/h, the photocatalytic activity value of the coating relative to the total amount of $TiO_2$ in the coating, PA, expressed in nm/h/($\mu$g/cm$^2$), and the amount Q of $TiO_2$ (contained in the nanoparticles and the binder) in the coating expressed in $\mu$g/cm$^2$.

TABLE 2

| % nano-particulate $TiO_2$ | % $TiO_2$ in the binder | % $SiO_2$ in the binder | PA' nm·h$^{-1}$ | Q = amount of $TiO_2$ (nanoparticles + binder)/ $\mu$g·cm$^{-2}$ | PA nm·h$^{-1}$·$\mu$g$^{-1}$·cm$^2$ |
|---|---|---|---|---|---|
| Series A | | | | | |
| 0 | 100 | 0 | 18 | 22.3 | 0.81 |
| 20 | 100 | 0 | 128 | 23.7 | 5.40 |
| 35 | 100 | 0 | 159 | 22.9 | 6.94 |
| 50 | 100 | 0 | 231 | 24.8 | 9.30 |
| 65 | 100 | 0 | 210 | 24.1 | 8.71 |
| 80 | 100 | 0 | 167 | 18.5 | 9.03 |
| 100 | 100 | 0 | 222 | 22.7 | 9.78 |
| Series B | | | | | |
| 0 | 14 | 86 | 0 | 1 | 0 |
| 10 | 14 | 86 | 0 | 8.3 | 0 |
| 25 | 14 | 86 | 0 | 17.6 | 0 |
| 50 | 14 | 86 | 58 | 32.7 | 1.77 |
| 75 | 14 | 86 | 233 | 42.1 | 5.53 |
| 90 | 14 | 86 | 535 | 49.7 | 10.77 |
| Series C | | | | | |
| 50 | 14 | 86 | 15 | 9.7 | 1.55 |
| 50 | 25 | 75 | 25 | 11.3 | 2.21 |
| 50 | 50 | 50 | 88 | 12.9 | 6.82 |
| 50 | 75 | 25 | 137 | 17.5 | 7.83 |

FIG. 4 shows in the form of a graph the photocatalytic activity of these coatings: on the x-axis is the percentage by weight of nanoparticles in the coating and on the y-axis the PA value: it clearly demonstrates that the more $TiO_2$ there is in the binder, the greater the photocatalytic activity (series C). Comparing series B with series C clearly shows that the amount of electronic conducting material in the binder has as significant an impact on the level of photocatalytic activity of the coating as the amount of $TiO_2$ nanoparticles.

Examples According to a Series D

A final series of examples relates to the variant in which the photocatalytic $TiO_2$ is generated in situ by thermal decomposition of at least partially crystallized ad hoc precursors (which may require a postdeposition annealing operation).

These examples use various types of binder apart from $TiO_2$. The $TiO_2$ coming from the thermal decomposition of precursors was partly crystallized in anatase (photocatalytic) form and partly amorphous. The coatings were deposited by liquid pyrolysis on a glass substrate already used for the previous examples.

Table 3 below gives, for each of the examples of this series:
  the type of binder (the formula $Sb_2O_x$ means that it is either $Sb_2O_3$ or $Sb_2O_5$, the oxygen stoichiometry not having been measured);
  the amount of $TiO_2$ in the coatings (measured by X-ray fluorescence: expressed in $\mu$g/cm$^2$: $Q_{TiO_2}$;
  the PA value, as defined above in nm/h/($\mu$g/cm$^2$); and
  the total amount of material of the coating, also expressed in $\mu$g/cm$^2$: $Q_{TOT}$.

For all these examples, the proportion of $TiO_2$ (which is either crystallized or amorphous) to the other components of the coating (the binder) is 90 mol % of $TiO_2$ per 10 mol % of Si or of another metal, depending on the examples.

TABLE 3

| EXAMPLES | $Q_{TiO2}$ | $Q_{TOT}$ | BINDER | PA |
|---|---|---|---|---|
| D-10 | 15.4 | 15.4 | $TiO_2$ | 19.4 |
| D-11 | 12.1 | 14.6 | $SnO_2$ | 11.5 |
| D-12 | 12.4 | 15.0 | F:$SnO_2$ | 12.5 |
| D-13 | 11.1 | 12.7 | $Al_2O_3$ | 4.8 |
| D-14 | 11.8 | 13.5 | F:$Al_2O_3$ | 4.7 |
| D-15 | 15.8 | 18.5 | $ZrO_2$ | 17.8 |
| D-16 | 16.0 | 18.7 | F:$ZrO_2$ | 20.0 |
| D-17 | 19.5 | 25.0 | $Sb_2O_x$ | 3.0 |
| D-18 | 17.0 | 21.8 | F:$Sb_2O_x$ | 1.5 |
| D-19 | 19.6 | 21.8 | ZnO | 1.8 |
| D-20 | 20.3 | 22.6 | F:ZnO | 2.2 |

The precursors for each of these examples were precursors of the organo-metallic, halide or metal salt type, known from the literature. In the case of example D-10 consisting entirely of $TiO_2$, this was the same precursor as in examples 1 to 5.

Table 4 below mentions, for these examples, the light transmission values $T_L$ measured under illuminant $D_{65}$ of the glasses thus coated and the Light reflection values $R_L$ (same illuminant). Also indicated are the diffuse transmission value $T_d$ also in %, and the delta $T_d$ value, which corresponds to the variation in diffuse transmission of the coatings after they have undergone the following mechanical abrasion test: the coating is subjected to a dry rubbing test consisting of a to-and-fro movement combined with a specific rotation of a loaded cylinder. The cylinder load was 390 g/cm$^2$, the to-and-fro speed 50 forward-and-back movements per minute and the specific speed of rotation was 6 revolutions per minute. The $T_d$ value was measured after 500 to-and-fro cycles.

TABLE 4

| EXAMPLES | $T_L$ | $R_L$ | $T_d$ | delta $T_d$ |
|---|---|---|---|---|
| D-10 | 83.3 | 16.2 | 0.5 | 0.6 |
| D-11 | 86.7 | 13.1 | 0.2 | 0.9 |
| D-12 | 86.3 | 13.4 | 0.3 | 0.5 |

TABLE 4-continued

| EXAMPLES | $T_L$ | $R_L$ | $T_d$ | delta $T_d$ |
|---|---|---|---|---|
| D-13 | 87.3 | 12.5 | 0.2 | 3.5 |
| D-14 | 86.3 | 13.5 | 0.2 | 2.6 |
| D-15 | 81.2 | 18.5 | 0.3 | 1.2 |
| D-16 | 80.9 | 18.8 | 0.3 | 0.6 |
| D-17 | 81.9 | 17.6 | 0.5 | 0.3 |
| D-18 | 83.2 | 15.1 | 1.7 | 1.2 |
| D-19 | 81.9 | 17.4 | 0.7 | 0.4 |
| D-20 | 81.3 | 18.3 | 0.4 | 1.3 |

These results confirm the previous ones, namely the "conducting" binders allow the performance of the photocatalytic coatings to be substantially improved, also obtaining abrasion-resistant coatings of good optical quality.

In conclusion, all of these results show that it is possible to select the best conducting binders according to the invention which allow the photogenerated electrons to be removed from the photocatalytic crystalline domains/particles and allow advantageous redox reactions to take place in the coating.

The invention claimed is:

1. A substrate having on at least part of at least one face a coating having photocatalytic properties, wherein the coating consists essentially of photocatalytic titanium oxide and a mineral binder, wherein the mineral binder comprises at least one semiconducting metal oxide, wherein the mineral binder has substantially no photocatalytic activity and wherein at least one of the semiconducting metal oxide(s) is doped.

2. The substrate as claimed in claim 1, wherein at least part of the photocatalytic titanium oxide is formed during formation of the coating.

3. The substrate as claimed in claim 1, wherein at least one of the semiconducting metal oxides of the binder has an electrical resistivity of less than or equal to $10^8$ ohm.cm.

4. The substrate as claimed in claim 1, wherein at least one of the semiconducting metal oxides of the binder is catalytic with respect to the reduction of oxygen.

5. The substrate as claimed in claim 1, wherein at least one of the semiconducting metal oxides of the binder:
   has the lowest energy level of its conduction band, which is less than or equal to the lowest energy level of the conduction band of the photocatalytic titanium oxide; and is close to the most probable electron energy level of the oxygen in the $O_2/H_2O_2$ and/or $O_2/H_2O$ redox couple.

6. The substrate as claimed in claim 1, wherein at least one of the semiconducting metal oxides of the binder is a titanium oxide, tin oxide, antimony oxide, zinc oxide, tungsten oxide, cobalt oxide, nickel oxide, nickel and cobalt mixed oxide, or a mixed manganite and cobaltite oxide.

7. The substrate as claimed in claim 1, wherein at least one of the semiconducting metal oxides of the binder is zirconium oxide or aluminum oxide.

8. The substrate as claimed in claim 1, wherein the binder is a mixture of zirconium oxide or titanium oxide with silicon oxide.

9. The substrate as claimed in claim 1, wherein at least one thin layer having any of an optical function, a thermal function or the ability to act as a barrier to the migration of species diffusing from the substrate is present between said substrate and the coating having photocatalytic properties.

10. The substrate as claimed in claim 1, comprising a transparent material of glass or polymer, or a ceramic, tile, brick, wood, metal, cement, stone, a fibrous material of insulating glass wool or an assembly of glass reinforcing yarns.

11. The substrate as claimed in claim 1, wherein the photocatalytic titanium oxide is in the anatase form.

12. The substrate as claimed in claim 1, wherein the semiconducting metal oxides of the binder are doped with a metal or a halogen.

13. The substrate as claimed in claim 1, wherein at least part of the photocatalytic titanium oxide is present in the coating in the form of preformed particles.

14. The substrate as claimed in claim 13, wherein the pre-formed particles are of nanometric size.

15. The substrate as claimed in claim 1, wherein at least one of the semiconducting metal oxides of the binder:
   has the lowest energy level of its conduction band, which is greater than the lowest level of the conduction band of the photocatalytic titanium oxide; and
   has electron states in the band gap.

16. The substrate as claimed in claim 15, wherein the electron states in the band gap are associated with structural defects, pendent bonds, or both.

17. The substrate as claimed in claim 1, wherein the binder further comprises an electrically insulating compound.

18. The substrate as claimed in claim 17, wherein the electrically insulating compound is a silicon derivative.

19. The substrate as claimed in claim 17, wherein the electrically insulating compound is a silicon derivative selected from the group consisting of silicon oxide, silicon oxynitride, silicon oxycarbide or silicon nitride.

20. The substrate as claimed in claim 1, wherein the content of the semiconducting metal oxide in the binder is at least 25% by weight.

21. The substrate as claimed in claim 20, wherein the content of the semiconducting metal oxide in the binder is at least 50% by weight and up to 100% by weight.

22. The substrate as claimed in claim 1, wherein the ratio by weight of the photocatalytic titanium oxide to the binder $R_{TiO_2/binder}$ is between 10/90 and 60/40.

23. The substrate as claimed in claim 22, wherein the $R_{TiO_2/binder}$ is between 10/90 and 50/50.

24. The substrate as claimed in claim 1, wherein the amount of titanium oxide present in the coating is from 5 to 100 µg/cm².

25. The substrate as claimed in claim 24, wherein the amount of titanium oxide present in the coating is from 10-50 µg/cm².

26. The substrate as claimed in claim 1, wherein the photocatalytic activity of the coating is at least 2 nm/h/(µg/cm²), relative to the total amount of titanium oxide of said coating.

27. The substrate as claimed in claim 26, wherein the photocatalytic activity of the coating is at least 5 nm/h/(µg/cm²).

28. The substrate as claimed in claim 26, wherein the photocatalytic activity of the coating is at least 20 nm/h/(µg/cm²).

29. The substrate as claimed in claim 1, wherein it is an architectural material.

30. The substrate as claimed in claim 29, wherein the architectural material is selected from the group consisting of a glazing, a roofing, a cladding, a floor, a false ceiling material, an oven wall, and a glazed wall.

* * * * *